May 15, 1923.
H. L. CUMMINS
PITTER
Filed Aug. 25, 1922
1,455,323
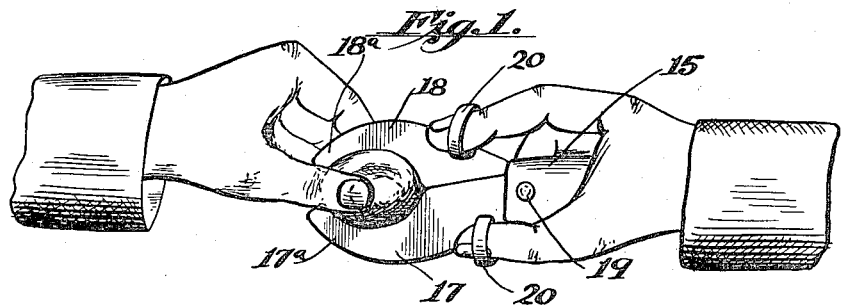
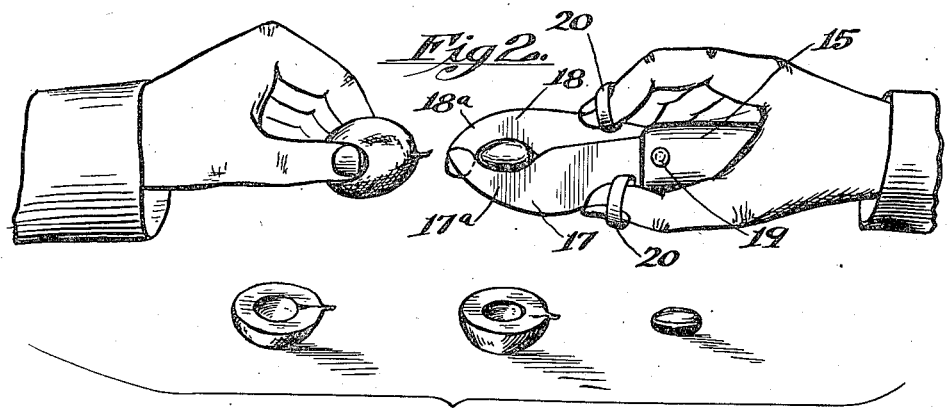
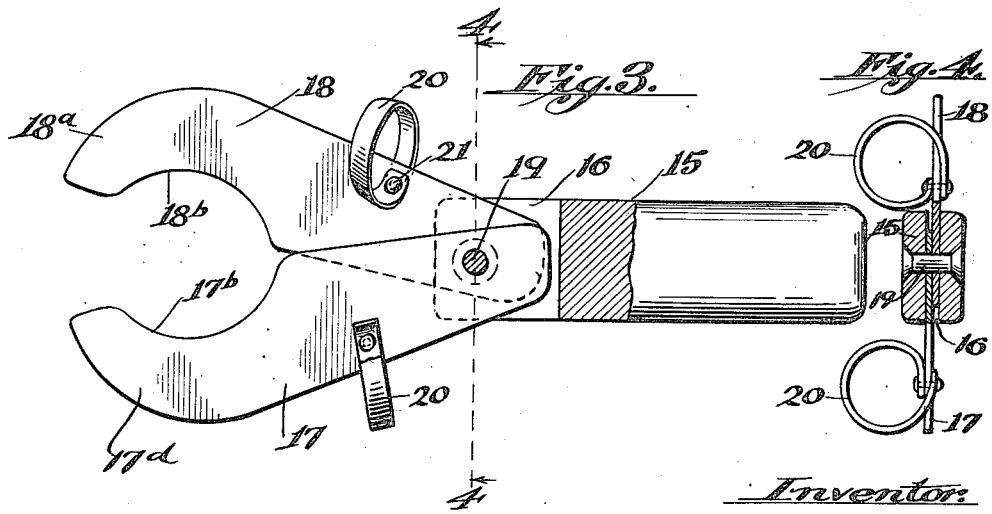
Inventor:
Herbert L. Cummins
By Hazard and Miller
Attorneys Patented May 15, 1923.

1,455,323

UNITED STATES PATENT OFFICE.

HERBERT L. CUMMINS, OF OWENSMOUTH, CALIFORNIA.

PITTER.

Application filed August 25, 1922. Serial No. 584,274.

*To all whom it may concern:*

Be it known that I, HERBERT L. CUMMINS, a citizen of the United States, residing at Owensmouth, in the county of Los Angeles and State of California, have invented new and useful Improvements in Pitters, of which the following is a specification.

My invention relates to fruit pitters, and a purpose of my invention is the provision of a pitter of extremely simple, inexpensive and durable construction which operates to cut and remove the pit or seed from fruit, such as apricots, peaches and the like, and in such manner as to divide the fruit into smoothly and evenly cut halves which are admirably adapted for preserving.

Although I have herein shown and described only one form of pitter embodying my invention, it is to be understood that various changes and modifications may be made herein without departing from the spirit of the invention and the spirit and scope of the appended claims.

In the accompanying drawings,

Figure 1 is a view showing one form of pitter embodying my invention in active position with respect to a piece of fruit and the manner in which the hands are employed in connection with the pitter.

Fig. 2 is a view similar to Fig. 1 showing the pitter after it has removed the seed from the fruit, and the halves of the fruit cut by the pitter.

Fig. 3 is a view showing in plan and partly in section the pitter shown in the preceding views.

Fig. 4 is a transverse sectional view taken on the line 4—4 of Fig. 3.

Referring specifically to the drawings in which similar reference characters refer to similar parts, my invention, in its present embodiment, comprises a shank 15 formed of wood or other suitable material and rounded at its corners to provide a handle which is adapted to be gripped in the operation of the pitter. One end of the shank 15 is slotted as indicated at 16 to accommodate the ends of blades 17 and 18, and a pin, screw, rivet, or the like 19 extends through the slotted end of the shank to pivotally support the blade ends upon the shank.

Each blade 17 or 18 includes an arcuate portion $17^a$ and $18^a$ which is sharpened on its inner edge to provide a cutting edge $17^b$ and $18^b$, the cutting edge of one blade cooperating with that of the other in effecting the cutting of fruit, as will be described hereinafter. Each blade carries a finger receiving member 20 which, in the present instance, is formed of a single length of metal secured at its ends to opposite sides of the blade as clearly shown in Fig. 4, and by means of a pin or rivet 21. The loops thus formed are adapted to receive the index finger and thumb in effecting an operation of the blades 17 and 18, in the manner clearly illustrated in Figs. 1 and 2.

In operation, the pitter is applied to a piece of fruit in the manner shown in Fig. 1, wherein it will be seen that the fruit is placed between the curved portions of the blades so as to be engaged by the cutting edges $17^b$ and $18^b$ when the blades are moved to contracted position. In the contracted position of the blades as shown in Fig. 1, the cutting edges penetrate the fruit until they engage the pit or seed. During this operation, the fruit is cut into equal halves, and the pit firmly gripped by the blade so that by pulling the fruit in a direction away from the pitter, as shown in Fig. 2, the pit is withdrawn from between the halves of the fruit, and without in any way disfiguring the fruit halves. This is of special importance, because in preserving it is highly desirable that the pieces of fruit be smooth and unbroken so that when preserved they will present a neat and attractive appearance.

The removal of the seed from the pitter is effected by movement of the blades to expanded position, and in an expanded position the pitter is again ready for the pitting of a second piece of fruit. The tool is easy of operation and can be manipulated rapidly with little practice so that the pitting of fruit can be effected with facility and dispatch.

What is claimed is:

1. A pitter comprising a shank, blades pivoted on the shank and having free ends of arcuate form with their inner edges sharpened to provide cutting edges, and finger receiving members carried by the blades for actuating the latter.

2. A pitter comprising a shank having a bifurcated end and providing a handle for the pitter, a pair of blades pivoted on the shank within the bifurcated portion and movable to occupy expanded or contracted positions, and finger receiving members fixed to the blades adjacent the handle for actuating the blades, said blades having semi-circular recess portions between their ends and at corresponding points, the edges of said portions being sharpened to provide cutting edges.

In testimony whereof I have signed my name to this specification.

HERBERT L. CUMMINS.